Dec. 2, 1969 A. M. HESTAD ET AL 3,482,052

TRANSFER AND SIGNALING CIRCUIT

Filed April 19, 1966 2 Sheets-Sheet 1

INVENTOR
A. M. HESTAD - D. L. NEEL
BY
[signature]
ATTORNEY

Dec. 2, 1969 A. M. HESTAD ET AL 3,482,052

TRANSFER AND SIGNALING CIRCUIT

Filed April 19, 1966 2 Sheets-Sheet 2

3,482,052

TRANSFER AND SIGNALING CIRCUIT

Alfred M. Hestad, Chicago, and Donald L. Neel, Lombard, Ill., assignors to International Telephone and Telegraph Corporation, New York, N.Y., a corporation of Maryland Filed Apr. 19, 1966, Ser. No. 543,598
Int. Cl. H04m 3/00
U.S. Cl. 179—18 5 Claims

ABSTRACT OF THE DISCLOSURE

This invention provides means for two way signalling over a path through an auxiliary PNPN diode matrix. Such signals are sent over the same path which carries the voice signals. The circuit discriminates between the directions of signalling by the polarity of the signal. The voice and control signals are separated by the duration of steady state conditions. Means are also provided to be certain that parallel crosspoint diodes will not fire falsely responsive to the signalling voltages.

Figure 1:
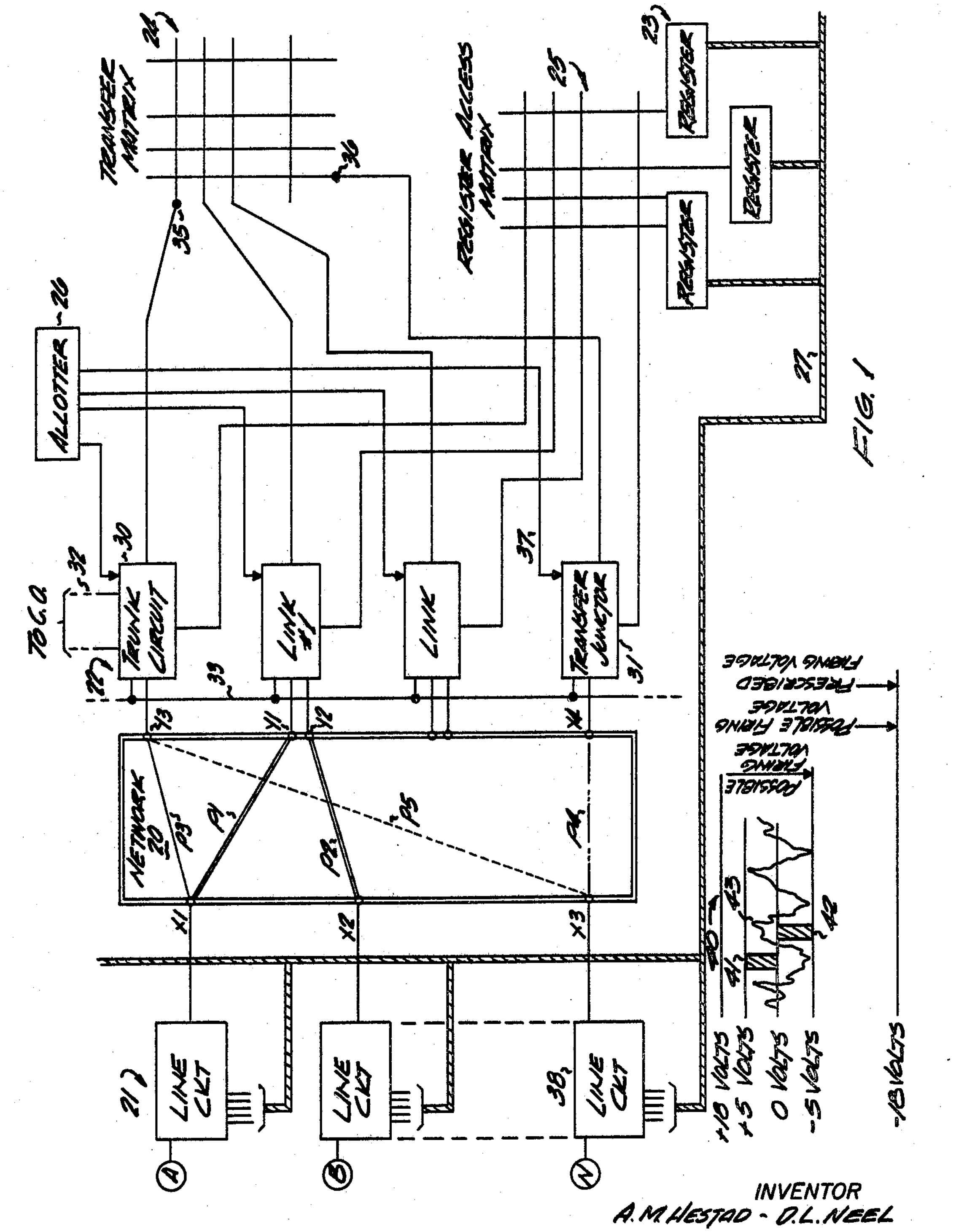

This invention relates to control circuits for electronic switching systems and more particularly to circuits for transferring calls previously extended through such system and thereafter signalling over the transfer path.

As used herein, the term "switching network" means a device for selectively extending electrical paths to interconnect one circuit with another circuit. The interconnected circuits may take many different forms; however, we find it convenient to refer to them as subscriber lines, and control circuits, by way of example. The paths are generally extended via these control circuits (usually called "links," "registers," or "junctors") which first complete a separate path through the network to each line and then join the separate paths via a voice gate. One example of a network such as that described herein, is found in U.S. Patent 3,204,044 entitled "Electronic Switching Telephone Systems," granted Aug. 31, 1965 to V. E. Porter, and assigned to the assignee of this invention.

The term "transfer circuit" refers to a circuit for dropping one path and extending another path, in lieu thereof, in the switching network disclosed in the Porter patent. In greater detail, the various control circuits must perform many functions during calls through the network. It is uneconomical to give every control circuit the capability of performing every function. Therefore, the control circuits are given specialized capability, and switch paths are transferred to the appropriate specialized circuit when its function is required. Thus the transfer circuits control the transfer of a switch path through the network from one control circuit to another control circuit for performing the desired function when such function is required. For example, if the network is part of a telephone system, the control circuit conducts a busy test, seizes a line or returns busy tone (as required), and then forwards ring current if the line is seized. In like manner many other functions could be required during a call such as: conversation timing, restricted service, executive right-of-way, and the transfer of trunk calls from link circuits to trunk circuits. Still other similar functions will readily occur to those skilled in the art. The transfer circuit will cause a path to fire to any of these special circuits when their services are required.

To accomplish such a transfer, one or more auxiliary networks are provided in addition to the principal network used to extend connections between subscriber lines. During discrete time frames, the link or connection control circuit has access to supplementary function control circuits via these auxiliary networks. An initial path fires from a link requesting service through the auxiliary network to any idle function control circuit during the discrete time frame which identifies the link. This way, the link may seize one or many function control circuits, either individually or simultaneously, and the seized function control circuit may also seize any other necessary control circuits as they are required. This means that a system of small design may be added onto and thereby grow into a larger system by the simple expedient of adding more and more function control circuits, connected together via auxiliary networks.

However, as the system design grows in size and complexity, it is necessary for these and other circuits to "talk" to each other. As the complexity of the system increases and more equipment is connected together via auxiliary networks, the amount of such machine talk increases out of proportion, until its requirements could become the most expensive part of the system, and there is a gross loss of efficiency. In the past, a suggestion has been made that duplicate, parallel paths could be completed through the auxiliary networks to carry this increased machine talk. However, this suggestion results in an out of scale increase in expense because extra controls are required to coordinate the parallel paths.

Accordingly, an object of the invention is to provide new and improved control systems especially—although not exclusively—for use in electronic switching telephone systems. Here an object is to provide for an increase in the amount of machine "talk" which can be carried over a single path.

In particular, an object is to meet the needs of a system which is too large for the inclusion of all function circuits in every control circuit without swamping equipment capabilities with control signals and too small for completely integrated common controls.

Another object of the invention is to reduce the cost of electronic switching systems by making a maximum use of existing designs. In particular, an object is to provide for a growth in the designed capacity of a smaller system by enabling it to give extra services and perform extra functions without simultaneously either obsoleting such smaller system design or making an uneconomical, over grown large system.

In keeping with an aspect of this invention, equipment on each end of a possible path through an auxiliary network is provided with a plurality of gating and detecting circuits. This equipment sends signals over the paths from one end with one polarity and from the opposite end with an opposite polarity. The gates and detectors are designed to discriminate between human speech and machine talk signals on the basis of their relative strengths and duration. Throughout, both machine talk signaling and voice transmission, all signals are clipped when they exceed a predetermined level. This clipping guards against falsely firing parallel connected electronic crosspoints in the auxiliary network.

Figure 2:
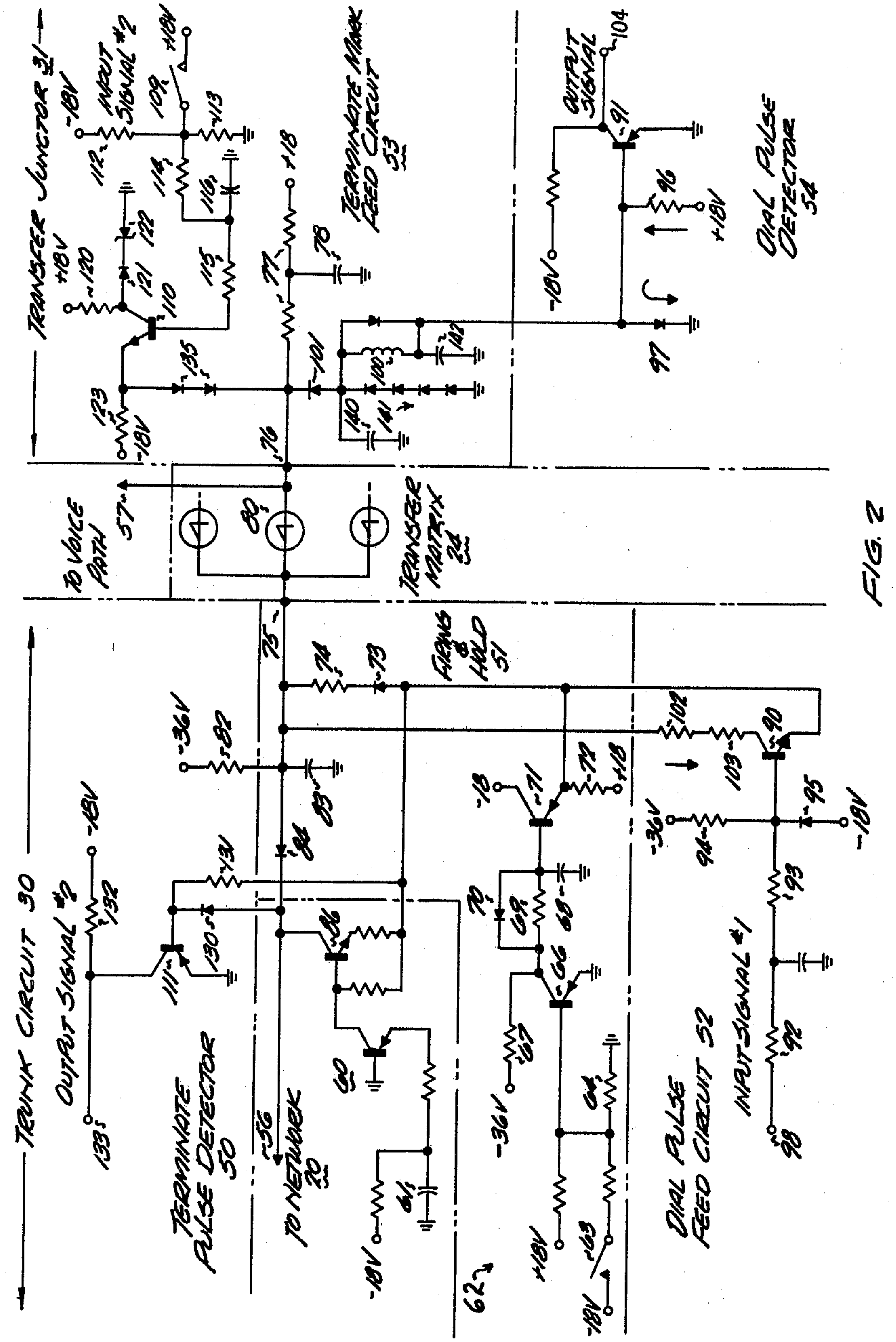

The above mentioned and other features of this invention and the manner of obtaining them will become more apparent, and the invention itself will be best understood by reference to the following description of an embodiment of the invention taken in conjunction with the accompanying drawings, in which:

FIG. 1 is a block diagram showing an electronic switching system incorporating the general principles of the invention; and FIG. 2 is a schematic diagram of a circuit incorporating the invention wherein two-way signaling and voice signals are transmitted over a single path fired through an auxiliary network.

FIG. 1 shows an exemplary electronic switching system comprising a principal switching network 20 primarily used for transmitting voice signals. A plurality of lines 21 are connected to one side of network 20, and links or connection control circuits 22 are connected to the other side. The primary purpose of this system is to interconnect two subscriber lines, such as lines A and B, for example, under the control of an idle one of the link circuits 22. In greater detail, assume that line A requests service by end marking the network 20 access point X1 at a time when link "1" is idle and end marking the point Y1. An originate path P1 (shown by a double line) finds its own way through network 20 responsive to the voltage stress appearing between these two end marked points. Then link "1" performs any controls functions required to extend a connection to called line B. Thereafter, a second or terminate path P2 (also shown by a double line) is fired between line B and link "1." The link interconnects paths P1, P2, and the subscribers at stations A, B may talk to each other.

A plurality of registers are shown at 23 for performing some of the functions required to establish a call. For example, the registers may perform the functions of called line selection, busy test, ring signal, and any other desired operations. These registers and other special function circuits are accessible to the link circuits 22 via one or more auxiliary switching networks 24, 25.

Each link may be given individual access through an auxiliary network to any individual function control circuits while the function is being completed. Then, after the function is so completed that auxiliary network path is dropped. In like manner, the link may gain access to any number of such function control circuits via the auxiliary networks at any time during a call. To give access and extend connecting switch paths through the auxiliary networks 24, 25, a master clock or allotter 26 generates the discrete time frame pulses which are used to identify either the individual links 22 or function control circuits, such as the register 23.

During a time frame which identifies a link, an initial path fires through the auxiliary network 25 to any idle marked access point associated with the appropriate functions control circuits 23. Immediately after the required functions are completed, this path is released. In the present example of a register, the required function is to return dial tone, receive and store dial pulses, and cause the requested switch path to be established. At this time, the function of the line circuit 21, is to recognize its code when register 23 marks cable 27 to indicate a called line condition and cause the establishment of the switch path by marking its network access point, such as point X2. The function of the links 22 is to mark the terminate access point, such as Y2. All of this is accomplished under the control of the register 23 which marks the cable 27 and signals the link when the switch path is to be completed. Then, the path is dropped through the auxiliary matrix 25. Thereafter, the link #1 controls and supervises the call while the register 23 goes on to serve another call.

The foregoing description of the operation of a register exemplifies an occasion when machine "talk" is required while the link #1 and register 23 pass dial tone, dial pulses, control signals, and the like between themselves. Another and more critical situation occurs when human talk is added to the inter circuit signaling requirements. An example of this type of situation occurs during al call transfer.

A transfer call involves a use of a trunk circuit 30 and a transfer junctor 31. For example, the trunk circuit 30 has access to a central office via a trunk line 32. All incoming calls are initially routed to an operator, attendant, guard, or other designated person. The transfer junctor 31 is then used by that person to transfer the trunk call to another local line. Obviously, the call transfer circuit could also be used during any other call and is not limited to use with incoming trunk calls.

In greater detail, an incoming trunk call begins with the functions described above in connection with a call from subscriber A to subscriber B. If subscriber A is calling, the register 23 recognizes the trunk call as such because the first digit that it receives is the number "9," for example. Responsive thereto, register 23 places a demand for a city trunk. If the city trunk circuit 30 is then free, the register 23 causes the associated link #1 to mark the conductor 33, thereby individualizing the link requesting a trunk call with a trunk line 32 leading to the central office, C.O. To avoid the possibility of a double trunk seizure, the trunk seizure function can occur only during the time frame when the allotter 26 enables the associated link #1.

During the trunk call, the link #1 drops its connection P1 through the network 20. Responsive thereto, the potential at point X1 climbs back toward the original end marking potential applied to network 20 when a path is demanded. Responsive to the demand on bus 33, the trunk circuit 30 marks the point Y3. Thus, a new path P3 (shown by a single, solid line) fires through the network 20. The call now proceeds from the line circuit through network 20 and trunk circuit 30 to the central office in a normal manner.

If an incoming call is received over trunk line 32, it may be extended through trunk circuit 30 to a designated person in any convenient manner. One way of so extending such a call would be to seize a register 23 via an access network 25. The register would then process the call on either a pre-wired or a direct dial basis to seize a called line.

Regardless of who placed or received the call, being described, it is here assumed that station A is connected over path P3 to the trunk circuit 30. It is further assumed that the subscriber at station A talks to the person who is using equipment connected to the distant end of the trunk line 32 and discovers that the call should be transferred to another subscriber station such as the station N.

Means are provided for completing a path through another separate and auxiliary switching matrix 24 to seize a control circuit (here called a "transfer junctor"). This circuit may be used for completing a call transfer function. More particularly, after the subscriber A learns that he must transfer his connection with the trunk line 32 to another subscriber line, he dials a predetermined digit such as the digit "1." The trunk circuit 30 recognizes this digit "1" as a request for transfer. Responsive thereto, trunk circuit 30 marks a separate transfer matrix 24, as at point 35. A marking potential also appears at point 36 when idle transfer junctor 31 is next allotted by a pulse on conductor 37. The potential difference between the points 35, 36 is now sufficient to fire a secondary control path through the transfer matrix 24 from trunk circuit 30 to the transfer junctor 31. Then transfer junctor 31 marks auxiliary matrix 25 to seize an idle register 23.

Register 23 returns dial tone to line A over a path traced from register 23, through matrix 25, transfer junctor 31, matrix 24, trunk circuit 30 and path P3. The subscriber on line A responds by dialing the directory number of line N which is stored in register 23 and then processed as any call is processed. When the allotter 26 next marks the lead 37 to enable transfer junctor 31, it applies an end-marking to point Y4 and simultaneously register 23 causes the called line circuit N to mark the point X3. Responsive thereto, path P4 (indicated by a dot-dashed line) finds its way through the network 20. The various subscribers may now talk to each other with voice signals going through the transfer matrix 24.

After the subscriber on calling line A completes his part of the call he dials the digit "2." The trunk circuit 30 recognizes this digit "2" as a disconnect signal and momentarily removes a holding potential from point Y3 to drop path P3. When the point Y3 is re-energized, trunk circuit 30 causes the transfer junctor 31 to deenergize the point Y4. This drops path P4 and causes path P5 (shown by a dotted line) to find its way through the network 20, and all associated equipment is released. Thereafter, line N is connected directly over path P5 and through trunk circuit 30 to trunk line 32. Since all of these functions occur at electronic speeds, the conversing subscribers do not realize when the paths over which they are talking are transferred through the various networks.

The need for the invention will become more apparent by reviewing the signaling and switching requirements which occurred during the events that have been described. Since the transfer call requires more signaling then the regular call, it will be analyzed here. However, the same principles apply to all calls. The paths fire through the various networks and auxiliary matrices when end-marking potentials are applied thereto. Thereafter, paths are held by a continuity of current therethrough.

A voltage scale at 40 (FIG. 1) arbitrarily shows that the network is designed to fire paths through the network and matrices when (+) 18 volts are applied to one side and (—) 18 volts are applied to the other side, thus creating a stress of 36 volts across the crosspoints. However, the crosspoint elements do not have perfectly uniform characteristics, and they may fire at lower than standard voltages owing to the rate effect. Thus, the graph at 40 has also been drawn to show that false firings could occur under a stress as low as 23 volts, (i.e. either from (—) 5 volts to (+) 18 volts or from (+) 5 volts to (—) 18 volts). During normal operations either (+) or (—) 18 volts could appear at one side or the other of a crosspoint at any time, but they never appear simultaneously across both sides of a crosspoint unless it is supposed to fire. The signal voltages can also appear at any time; therefore, they cannot be allowed to swing beyond (+) or (—) 5 volts to avoid possible false firings. It is necessary to send dial pulses and other command signals (such as release signals) through the auxiliary networks. Conveniently, these pulses and command signals have a substantially square shape as shown at 41, 42. Such a square shape is most likely to fire the crosspoints at the lower 23 volts of the rate effect. Therefore, it is doubly necessary to clip these pulses and signals at the (+) or (—) 5 volt limit. It is also necessary to send the analog voice signals 43 through the auxiliary networks. For example, subscriber A may talk to subscriber N over the circuit including line circuit 21, path P3, trunk circuit 30, transfer matrix 24, transfer junctor 31, path P4, and line circuit 38. In summary, the signaling circuit should be able to separate command signals by direction of transmission and the pulse characteristics of the signal without allowing the voltage to swing further than the (+) or (—) 5 volt limits and without interruption of current. Moreover, the analog voice signals should be transmitted free of all distortions.

In keeping with an aspect of the invention, these signaling requirements may be provided by a circuit which separates the direction of signaling by the polarity of signals and provides voice immunity by circuits which distinguish between the characteristics of speech and those of the signal pulses. Thus, the negative signal 42 might be used to signal from the trunk 30 to the transfer junctor 31, and the positive signal 41 might be used to signal from the junctor to the trunk. One example of a circuit for signaling in this manner is shown in FIG. 2.

Dot-dashed lines separate FIG. 2 into the functional circuits necessary for the logical divisions indicated by the blocks of FIG. 1. These logical divisions are designated as trunk circuit 30, transfer matrix 24, and transfer junctor 31. The functional circuits within the blocks are designated as terminate pulse detector 50, fire and hold circuit 51, dial pulse feed circuit 52, terminate mark and feed circuit 53, and dial pulse detector 54. The use of these particular designations and terms is not to be taken as limiting on the invention.

Signaling in the direction from the trunk circuit 30 toward the junctor 31 begins at the dial pulse feed circuit 52 and is detected at the circuit 54. These signals have a negative polarity. Signaling in the reverse direction from the junctor 31 toward the trunk circuit 30 begins at terminate mark and feed circuit 53 and ends at circuit 50. These signals have a positive polarity. Voice signals enter the trunk circuit at terminal 56 and leave the junctor at 57.

In greater detail, a circuit at 60 provides the uninterrupted current required to hold a path through a network. Capacitor 61 is a by-pass for noise. The remaining components in circuit 60 are essentially the same as those shown and described in U.S. Patent 3,223,781 granted Dec. 14, 1965 to A. M. Hestad and assigned to the assignee of this invention.

Firing pulses for extending a path through the transfer matrix 24 are generated under the control of a circuit shown at 62. A firing pulse is generated responsive to a command, here simulated by a key 63. This circuit 62 includes a biasing and gating circuit coupled to the base of a PNP transistor 66 arranged in common emitter configuration. Resistor 67 is a collector load for the transistor 66. Coupled to the collector of the transistor 66 is a pulse shaping circuit including a capacitor 68 for slowing the rise time of a firing pulse. Resistor 69 controls the time constant of capacitor 68, and therefore the rise time of the firing pulse. A diode 70 prevents certain reverse voltage spikes which might otherwise cause the transistor 66 to feed an unduly large current into the capacitor 68. The PNP transistor 71 is an electronic switch for applying or removing a (+) 18 volt potential through a resistor 72, diode 73 and resistor 74 to matrix access point 75.

In operation, switch 63 is normally closed to apply a negative potential to the base of transistor 66 which is, therefore, normally turned on. The current from ground potential on the emitter of the transistor 66 feeds into the base of transistor 71 which conducts at a low level to cause its emitter to be near the ground potential. Diode 73 is thus forwardly biased to clamp the access point 75 to a potential near ground.

When switch 63 opens, transistor 66 turns off, and the base of transistor 71 moves toward the (—) 36 volt applied through the resistor 67. The transistor 71, therefore, becomes saturated at a rate set by the characteristics of the capacitor 68 as it is charged through the resistor 69. The emitter of the transistor 71 moves toward the (—) 18 volts on its collector. As the ground clamping potential disappears from the point 75, it moves toward the (—) 36 volts applied through the resistor 82. Again, the voltage movement at point 75 is slowed by the charging time of the capacitor 83 to slow the rise time of the end-marking voltage appearing at the point 75 on the transfer matrix 24. As the point 75 moves negative, the diode 84 becomes back-biased to isolate the network 20 from the potential firing pulse. This isolation will prevent an unwanted firing in network 20.

When the transfer junctor 31 is idle, the point 76 is standing at (+) 18 volts less any IR drop across the resistor 77. The capacitor 78 slows any voltage changes which may occur. The voltage stress resulting from the potential difference across points 75, 76 fires the PNPN diode 80 in the transfer matrix 24. The combined effects of the capacitors 68, 78, and 83 slow the firings sufficiently to prevent any parallel firing, at the lower rate effect voltage, inside the transfer matrix 24.

After the path fires through the transfer matrix 24, it is held by current from transistor 86 in the manner descibed in the above identified Hestad patent. The collector voltage of the transistor 86 is about (—) 2.4 volts. The diode 84 conducts, and the point 75 is also about (—) 2.4 volts. Meanwhile the switch 63 remains open until the path through the transfer matrix is to be released. Thus, the emitter of transistor 71 stands at approximately (—) 18 volts, as explained above. The diode 73 is, therefore, back-biased to prevent the (—) 18 volts on the emitter of transistor 71 from having any effect at the point 75.

Means are provided for sending signals of a first polarity from the trunk circuit 30 to the transfer junctor 31. These signals are described here as dial pulses because such pulses are used most commonly. However, the invention is not to be construed as limited thereto.

In greater detail, the circuit for the transmission of signals from the trunk circuit 30 to the transfer junctor 31 includes the two transistors 90, 91, both of which are coupled in common emitter configurations. The base bias derived from the components 92–95 normally hold the NPN transistor 90 in virtually an off state or low level conductor condition.

Normally, current flows from a (+) 18 volt source through a resistor 96 and diode 97 to ground with a clamping effect such that the anode of the diode 97 stands at about (+) 1 volt. A little of the current through resistor 96 may also flow off to point 76 and through the PNPN diode 80. However, such current merely adds to that coming through the resistors 77. The total of this combined current is limited at circuit 60 so that there is no practical effect.

When a dial pulse appears at the input terminal 98, the base of the NPN transistor 90 goes positive relative to its emitter, and it conducts more heavily. Transistor 90 draws current over the path traced from a (+) 18 volt source, through the resistor 96, a voice frequency choke coil 100, a diode 101, point 76, the PNPN diode 80, point 75, resistors 102, 103, transistors 90 and 71 to a (−) 18 volt source. The circuit values are selected so that all of the current through the resistor 96 is now drawn over the path leading to point 76. Therefore, the potential at the anode of the diode 97 moves toward the (−) 2.4 volts being supplied from the circuit 60. Thus, the diode 97 is now back-biased. The characteristics of that circuit prevents its output from experiencing any substantial change from this (−) 2.4 volts during dial pulsing.

When the base of the transistor 91 goes negative relative to its emitter it turns on and an output signal, in the form of a ground pulse, appears at the point 104. When the dial pulse disappears from the terminal 98, the process reverses. The transistor 91 turns off, and the ground pulse signal disappears from the output terminal 104. Hence it is seen that negative polarity signals may be sent from the trunk circuit 30 to the junctor 31. Any suitable logic circuitry connected to the terminal 104 interprets the true meaning of such signal in accordance with the code or manner in which ground pulses appear or disappear at the terminal 104.

Means are provided for sending command signals from the transfer junctor 31 to the trunk circuit 30 (the command signal is here, called a "terminate mark" because it drops path P3 in FIG. 1). However, such signals could also have other effects. This means also includes two transistors 110, 111, both of which are coupled in a common emitter configurations and controlled by a switch 109. However, the polarity of the signal is reversed here, as compared to the polarity of the dial pulse signaling. Stated in another manner, the dial pulse signals are negative in the trunk circuit 30 and positive in the transfer junctor 31 while the command signals are negative in the transfer junctor 31 and positive in the trunk circuit 30.

In greater detail, the base bias is applied to the NPN transistor 110 via a resistor network 112–115. A capacitor 116 slows the rise time of any voltage changes occurring at the base. The collector load for the transistor 110 includes a resistor 120, diode 121, and Zener diode 122 connected to divide the voltage between a (+) 18 volt source and ground. Diode 121 performs a clamping function, and Zener diode 122 performs a voltage regulating function. An emitter bias is supplied to the transistor 110 through a resistor 123. On the other end of the path through transfer matrix 24, the base of PNP transistor 111 is coupled to the line via an isolating diode 130. Base bias is applied to transistor 111 through a resistor 131. The resistor 132 is a collector load. Thus, the transistor 111 in trunk circuit 30 conducts each time that a switch 109 is closed in the transfer junctor 31. Any suitable logic circuitry may be coupled to the trunk circuit output terminal 133 to interpret the meaning of the signals which are so received from the transfer junctor.

The signaling circuit is immune from interference by voice signals. First, the diodes 130, 73, 101, 135 isolate the common parts of the transfer matrix path which are shared by all signals. Second, a voice frequency choke coil 100 has a time constant which allows a response only when a steady state D.C. condition has persisted for, say 60 milliseconds. The dial pulse signals have, but the speech signals do not have, such characteristics.

The capacitor 140 slows responses when the voltage changes in the transfer matrix 24. The diodes 141 clamp voltage spikes, and clip all signals at a voltage level which precludes false firing in the matrix 24. The capacitor 142 decouples and smooths the voltages.

While the principles of the invention has been described above in connection with specific apparatus and applications, it is to be understood that this description is made only by way of example and not as a limitation on the scope of the invention.

We claim:

1. An electronic switching system comprising a network of solid state crosspoints for extending a single path between pieces of control equipment when a firing potential is applied across the network, said path having said control equipment connected to each end thereof for transmitting signals over said path, means in said equipment for transmitting an analog type of signal over said path in either of two directions, means for transmitting a first pulse type of signal over said path in one direction in the form of a first polarity signal, means for transmitting a second pulse type of signal over said path in an opposite direction in the form of an opposite polarity signal, and means for discriminating between said analog and pulse types of signals on a basis of their relative strengths and duration.

2. The system of claim 1 and means for guarding against falsely firing paths through said network parallel to said single path responsive to the transmission of said signals over said path.

3. The system of claim 2 wherein said guarding means comprises means for clipping all signals transmitted over said path at voltages which are less than a firing voltage under the most favorable firing conditions.

4. A voice switching system comprising means including a first network of crosspoints for connecting voice paths from a first selected inlet to a control circuit connected at a first selected outlet of said first network, auxiliary crosspoint network means for selectively connecting said control circuit to other equipment, means for transmitting both voice and control signals from said control circuit through said auxiliary network to said other equipment, said transmission being in either of two directions, said other equipment comprising a transfer junctor, a trunk circuit, means for temporarily connecting said voice path from said control circuit through said auxiliary network to said transfer junctor, transfer means responsive to at least some of said signals transmitted through said auxiliary network for transferring said voice path in said first network from the connection with said control circuit to a connection with said trunk circuit through a second selected outlet, said transfer means comprising means responsive to other of said signal means for selectively transferring said voice path through said first network from said first selected inlet to a second selected inlet, said some of said signals and said other of said signals which control the transfer of said voice paths being dial pulses and transfer command signals, and means for transmitting said dial pulses through said auxiliary network by means of signals of a first polarity and for transmitting said command signals through said auxiliary network by means of signals of a second polarity.

5. The system of claim 4 wherein the characteristic of each of said dial pulses and command signals is a steady state condition of a duration which exceeds comparable steady state condition appearing in the electrical analog signals of human speech, and means for precluding a dial or control signal type of response unless said signals have said characteristic steady state duration.

References Cited

UNITED STATES PATENTS 3,324,248 6/1967 Seemann et al.

KATHLEEN H. CLAFFY, Primary Examiner

WILLIAM A. HELVESTINE, Assistant Examiner